Sept. 9, 1947.  C. H. SMOOT  2,427,235
CONTROL INSTRUMENT
Filed Sept. 11, 1944
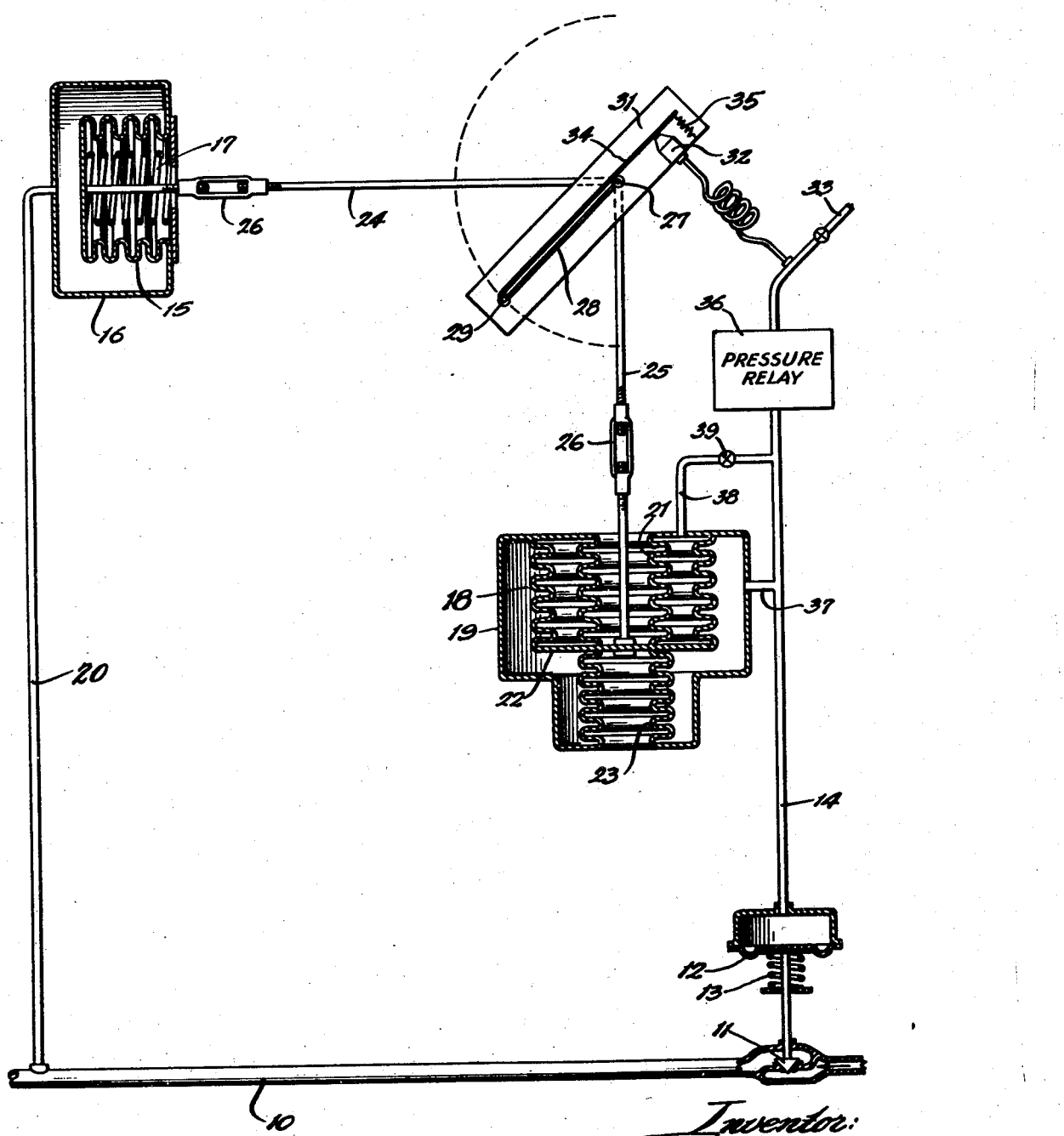
Inventor:
Charles H. Smoot,
By Dawson, Ooms & Booth,
Attorneys.

Patented Sept. 9, 1947

2,427,235

UNITED STATES PATENT OFFICE 2,427,235

CONTROL INSTRUMENT

Charles H. Smoot, Chicago, Ill., assignor to Republic Flow Meters Company, Chicago, Ill., a corporation of Illinois Application September 11, 1944, Serial No. 553,638

7 Claims. (Cl. 137—153)

This invention relates to control instruments and more particularly to control mechanism responsive to a condition to produce a regulating force for controlling the condition to maintain it at the desired value.

One of the objects of the invention is to provide a control instrument of the type in which a regulating force is employed to reset the instrument to prevent over control or hunting and in which the relative effects of the controlling force and the regulating force can be adjusted.

It is a specific object of the invention to provide an instrument for producing a regulating pressure for effecting a control function and for resetting the instrument in which the ratio between the control pressure and the regulating pressure can be adjusted.

Another object of the invention is to provide a control instrument in which accurate and reliable operation is obtained in all positions of adjustment. In one preferred construction the ratio of controlling and regulating pressures is adjusted by movement of a part which carries control means for producing the regulating pressure.

The above and other objects and advantages of the invention will be more readily apparent from the following description when read in connection with the accompanying drawing, in which—

The single figure is a diagrammatic view of a control instrument embodying the invention.

The instrument of the present invention is adapted to control any desired condition such as pressure, temperature, flow or the like and is illustrated by way of example only, for controlling the pressure in a conduit 10 which is supplied with fluid under the control of a valve 11. The valve 11 is operated by a flexible diaphragm 12 urged in a direction to open the valve by a spring 13 and supplied with pressure on its upper side to close the valve thru a pipe 14.

The instrument comprises a force producing element responsive to the condition to be controlled. In the embodiment shown, the element comprises a flexible bellows 15 enclosed by a housing 16 and urged in one direction by a spring 17. The housing 16 is connected to the pipe 10 by a conduit 20 so that the pressure in the housing urges the bellows to the right against the spring 17.

A second pressure responsive element is provided to oppose the bellows 15 and as shown comprises a flexible bellows 18 connected at one end to the end of a housing 19. A second bellows 21 concentric with the bellows 18 is also connected at one end to the housing and the free ends of the bellows are connected to a disc 22. The disc is connected to the housing for movement therein by a sealing bellows 23 of the same size as the bellows 21 and aligned therewith.

The two bellows operate connecting rods 24 and 25 which may be adjusted thru turnbuckles 26 and which are moved longitudinally by operation of the bellows. The rods 24 and 25 lie at a right angle to each other and are pivotally interconnected by a pivot 27. The pivot 27 is also connected to one end of a link 28 whose opposite end is pivoted at 29 on a supporting member 31. The member 31 is mounted for angular adjustment about a center coaxial with a pivot 27 when the parts are in their neutral position.

Movement of the pivot 27 and of the link 28 about its pivot 29 produces a regulating pressure for controlling the valve 11. For this purpose, a fluid nozzle 32 is mounted on the support 31 and is supplied with fluid under pressure from any suitable source thru a pipe 33. Pressure in the nozzle 32 is controlled by a vane 34 movable toward and away from the nozzle. The vane 34 is pivoted at one end on the pivot 29 and is urged into engagement with the pivot 27 by a spring 35. This construction prevents damage to the valve parts in the event of movement of the pivot 27 to the right as seen in the drawing, the pivot 27 simply moving away from the valve member 34 after it engages the nozzle 32.

The regulating pressure produced in the nozzle 32 by operation of the valve mechanism is transmitted either directly or thru a pressure relay 36 as shown, to the pipe 14 which is connected thru an unrestricted connection 37 to the casing 19. The pipe 14 is also connected thru a pipe 38 having a time delay restriction 39 therein to the space between the bellows 18 and 21.

In operation of the apparatus when the pressure in the pipe 10 is at the desired value the pressures in the housing 19 and in the space between the bellows 18 and 21 are equal so that no force is exerted by these bellows. It will be noted in this connection that the effective areas of the disc 22 exposed to the internal and external pressures are equal due to the use of the sealing diaphragm 23 so that when the pressures are equal no force is exerted. If the pressure in the pipe 10 should increase above the desired value the bellows 15 will be moved to the right against the spring 17 to move the pivot 27 to the right and allow the spring 35 to move the vane 34 toward the nozzle 32. This will increase the pressure in the pipe 14 tending to close the valve 11 to reduce the pressure in the pipe 10. At the same time, the increased pressure in pipe 14 will flow into the housing 19 through the connection 37 to urge the bellows 18 upwardly to balance the increased force exerted by the bellows 15. This operation will tend to return the vane 34 to its neutral position. The increased pressure in the housing 19 will be gradually balanced by the slow increase of pressure between the bellows 18 and 21 to remove the compensating force of the bellows 18. If the apparatus is properly adjusted, this will occur at such a rate that the pressure in the pipe 10 has been fully corrected by the valve 11 when the pressures in the housing 19 and between the bellows 18 and 21 are balanced.

Upon a decrease in pressure in the pipe 10 a reversal in the above described cycle of operations will occur. In this case, the bellows 15 will move to the left moving the vane 34 away from the nozzle 32 and reducing the pressure in the pipe 14 to allow the valve 11 to open. The pressure in the housing 19 will be reduced quickly and expansion of the fluid in the space between the bellows 18 and 21 will exert a downward force on the rod 25 tending to move the pivot 27 to the right to increase the pressure in the nozzle 32.

By adjusting the angular position of the supporting member 31 about its center, the ratio between the controlling and resetting or regulating pressures can be adjusted. In the position shown, in which the support lies midway between the rods 24 and 25, the controlling and regulating pressure changes will be equal. If it is desired to increase the regulating pressure relative to the controlling pressure the support may be turned counter-clockwise to increase the effect of the bellows 15 on the pivot 27 while reducing the effect of the compensating bellows 18 and 21. In this case, the regulating pressure produced in the pipe 14 will be greater than the controlling pressure acting on the bellows 15. Similarly, by turning the support 31 clockwise, the effect of the regulating pressure on the mechanism can be made greater than that of the controlling pressure so that the regulating pressure will be less than the controlling pressure.

An inverse relationship between the controlling and regulating pressures can be obtained by turning the support 31 counterclockwise to a position past the rod 24. Such a position might be used for example, in cases where the flow through pipe 10 is from left to right. With the support in this position an increase in the controlling pressure will cause the vane 34 to move away from the nozzle 35 to decrease the regulating pressure. Thus, by the present invention any desired relationship between the controlling and regulating pressures can be obtained.

The relationship for which the apparatus is adjusted will be accurately maintained over a wide range of adjustment and operation due to the mounting of the control mechanism on the support itself. With this construction, the position of the control vane 34 is accurately regulated in accordance with movements of the pivot 27 without requiring external linkage connecting the pivot to the valve member. Thus the valve will always be controlled strictly in accordance with the balance between the controlling and regulating pressures in all position of adjustment.

While one embodiment of the invention has been shown and described in detail, it will be understood that this is illustrative only, and is not intended as a definition of the scope of the invention reference being had for this purpose to the appended claims.

What is claimed is:

1. In a control instrument, means for producing a force proportional to a condition to be controlled, a second force producing means, members connected to said means and lying at an angle to each other, a link, a common pivot to which the members and one end of the link are pivoted, adjustable means pivotally supporting the other end of the link by the adjustment of which the angle of the link relative to the members can be adjusted, means carried by said adjustable means and controlled by movement of the pivot to produce a regulating force, the second force producing means being responsive to the regulating force to oppose the force of the first means tending to move the pivot, and time delay means associated with the second force producing means to balance the force produced in response to the regulating force after a time interval.

2. In a control instrument, a first pressure responsive element responsive to a condition to be controlled, a second pressure responsive element responsive to a regulating pressure, rods connected to said elements to be moved longitudinally thereby and lying at an angle to each other, a link, a common pivot to which the free ends of the rods and one end of the link are pivoted, adjustable means pivotally supporting the other end of the link and adjustable to vary the angle of the link relative to the rods, means carried by the adjustable means and controlled by movement of the pivot to produce a regulating pressure, a third pressure responsive element opposing the second element, and time delay means connecting the third element to the last named means to supply regulating pressure thereto.

3. In a control instrument, a pair of force producing devices, rods connected to the devices respectively to be moved thereby and lying at an angle to each other, a pivot to which the ends of the rods are pivoted, a link pivoted at one end to the pivot, a support on which the other end of the link is pivotally mounted, means mounting the support for adjustment angularly about a center coaxial with the pivot, a control device on the support for producing a regulating force, and a connection between the link and the control device to operate the control device in response to angular movement of the link about its pivot on the support.

4. In a control instrument, a pair of force producing devices, rods connected to the devices respectively to be moved thereby and lying at an angle to each other, a pivot to which the ends of the rods are pivoted, a link pivoted at one end to the pivot, a support on which the other end of the link is pivotally mounted, means mounting the support for adjustment angularly about a center coaxial with the pivot, a fluid nozzle on the support, a valve member movable toward and away from the nozzle, and means operatively connecting the valve member to the pivot to move the valve member in response to movement of the pivot.

5. In a control instrument, a pair of force producing devices, rods connected to the devices respectively to be moved thereby and lying at an angle to each other, a pivot to which the ends of the rods are pivoted, a link pivoted at one end to the pivot, a support on which the other end of the link is pivotally mounted, means mounting the support for adjustment angularly about a center coaxial with the pivot, a fluid nozzle on the support, a valve member pivoted on the support coaxially with the link and movable toward and away from the nozzle, and a spring holding the valve member against the pivot whereby it will be moved in response to movement of the pivot.

6. In a control instrument, a first pressure responsive element responsive to a pressure to be controlled, a second pressure responsive element, rods connected to the elements and lying at an angle to each other, a pivot to which the ends of the rods are pivoted, a link pivoted at one end to the pivot, a support to which the other end of the link is pivoted, means mounting the support for adjustment angularly about a center coaxial with the pivot, a fluid nozzle on the support, a valve member operatively connected to the pivot and movable thereby toward and away from the nozzle to control the pressure therein, and a connection from the nozzle to the second pressure responsive element.

7. In a control instrument, a first pressure responsive element responsive to a pressure to be controlled, a second pressure responsive element, rods connected to the elements and lying at an angle to each other, a pivot to which the ends of the rods are pivoted, a link pivoted at one end to the pivot, a support to which the other end of the link is pivoted, means mounting the support for adjustment angularly about a center coaxial with the pivot, a fluid nozzle on the support, a valve member operatively connected to the pivot and movable thereby toward and away from the nozzle to control the pressure therein, a connection from the nozzle to the second pressure responsive element, a third pressure responsive element opposing the second element, a connection from the nozzle to the third element, and means forming a time delay restriction in the last named connection.

CHARLES H. SMOOT.

REFERENCES CITED

The following references are of record in the file of this patent:

UNITED STATES PATENTS

| Number | Name | Date |
| --- | --- | --- |
| 2,352,312 | Donaldson | June 27, 1944 |
| 2,016,824 | Smith | Oct. 8, 1935 |
| 2,361,885 | Tate | Oct. 31, 1944 |
| 1,897,135 | Mason | Feb. 14, 1933 |
| 2,290,987 | Moore | July 28, 1942 |
| 2,117,800 | Harrison | May 17, 1938 |
| 2,098,914 | Gorrie | Nov. 9, 1937 |
| 2,149,390 | Donaldson | Mar. 7, 1939 |
| 2,272,256 | Vogt | Feb. 10, 1942 |